United States Patent [19]

Kobayashi

[11] Patent Number: 4,919,361
[45] Date of Patent: Apr. 24, 1990

[54] FISHING SPINNING REEL
[75] Inventor: Takehiro Kobayashi, Hiroshima, Japan
[73] Assignee: Ryobi Ltd., Hiroshima, Japan
[21] Appl. No.: 304,006
[22] Filed: Jan. 30, 1989

Related U.S. Application Data

[63] Continuation of Ser. No. 46,162, May 5, 1987, abandoned.

[30] Foreign Application Priority Data

May 12, 1987 [JP] Japan .............................. 61-71804[U]

[51] Int. Cl.[5] ........................................... H01K 89/02
[52] U.S. Cl. ..................................... 242/309; 242/247
[58] Field of Search ...................... 242/84.1 R, 84.2 R, 242/84.2 A, 84.2 G, 84.21 R, 84.5 R, 84.5 A, 84.51 R, 84.51 A, 230, 247, 300; 188/82.1, 82.3, 82.34, 82.4; 74/576, 577 S

[56] References Cited

U.S. PATENT DOCUMENTS

| 4,300,730 | 11/1981 | Carlsson et al. | 242/84.2 R |
| 4,340,189 | 7/1982 | Volkert et al. | 242/84.1 R |
| 4,359,197 | 11/1982 | Neufeld | 242/84.5 A |
| 4,391,418 | 7/1983 | Puryear | 242/84.5 A X |
| 4,546,932 | 10/1985 | Ohmori | 242/84.5 A X |
| 4,614,314 | 9/1986 | Ban | 242/84.2 G |
| 4,650,134 | 3/1987 | Councilman | 242/84.1 R X |

FOREIGN PATENT DOCUMENTS

| 1073794 | 1/1960 | Fed. Rep. of Germany | 242/84.2 R |
| 57-25574 | 2/1982 | Japan . | |
| 59-21665 | 6/1984 | Japan . | |

Primary Examiner—Joseph J. Hail, III
Attorney, Agent, or Firm—Finnegan, Henderson, Farabow, Garrett and Dunner

[57] ABSTRACT

A fishing spinning reel having reverse-rotation-preventing mechanism comprising a plastic spring press-fitted on a master gear shaft and having a protrusion extending radially therefrom to engage a recess formed in a reverse-rotation-preventing pawl pivotally mounted on the reel body, so that the pawl engages a ratchet formed on a rotor-supporting cylindrical shaft when the handle is turned in the reverse direction and disengages from the ratchet when the handle is turned in the forward direction.

6 Claims, 2 Drawing Sheets

FISHING SPINNING REEL

This application is a continuation of application Ser. No. 046,162, filed May 5, 1987 now abandoned.

BACKGROUND OF THE INVENTION

This invention relates to a fishing spinning reel having a mechanism for preventing reverse rotation during use of the reel.

Examples of a conventional reverse rotation preventing mechanism of this type have been disclosed by Japanese Utility Model Application Publication No. 21665/1984 and Japanese Utility Model Application (OPI) No. 25574/1982 (the term "OPI" as used herein means "an unexamined published application").

In the mechanism disclosed in the first of the above applications, an operating ring has a protrusion for depressing a reverse-rotation-preventing gear and a protrusion adapted to abut against a change-over shaft. A close dimensional relation between the two protrusions is essential, and if the protrusions do not have the required dimensional accuracy, then the mechanism is liable to operate erroneously. That is, the mechanism must be manufactured with high dimensional accuracy.

In the mechanism of the second, its master gear shaft has a collar with a groove, and one end of a spring is fitted in the groove with the other end abutted against a locking pawl. Therefore, when the second mechanism is used for a long time, the groove of the collar becomes worn and obstructs the smooth operation of the spring.

In both of the above reverse rotation preventing mechanisms, an elastic force is applied to a reverse-rotation-preventing pawl to cause the latter to engage a ratchet. Therefore, when the reel handle is turned in the forward direction, the reverse-rotation-preventing pawl must be turned against the elastic force. For this purpose, the force of an operating ring or spring holding the master gear shaft must be set high. However, if the force is high, there is considerable resistance to the forward rotation of the handle; that is, the handle cannot be turned smoothly, and the parts are easily worn, thus adversely affecting the reliability and durability of the mechanism.

SUMMARY OF THE INVENTION

Accordingly, an object of this invention is to eliminate the above-described difficulties in a fishing spinning reel having a conventional reverse-rotation-preventing mechanism.

More specifically, an object of the invention is to provide a reverse-rotation-preventing mechanism for a fishing spinning reel which operates correctly at all times, even if dimensions are somewhat inaccurate.

Another object of the invention is to provide a reverse-rotation-preventing mechanism for a fishing spinning reel in which the wear of the master gear shaft and the spring is minimized and the durability is improved.

A further object of the invention is to provide a reverse-rotation-preventing mechanism for a fishing spinning reel which operates positively at all times.

The foregoing objects and other objects of the invention are achieved by a fishing spinning reel comprising: a reel body; a master gear shaft rotatably mounted in the reel body; a master gear attached to the master gear shaft; rotating means for rotating the master gear shaft and the master gear; a cylindrical shaft rotatably mounted in the reel body and operatively connected to the master gear to turn a rotor; a ratchet on the cylindrical shaft; an arcuate spring member rotatably mounted on and frictionally engaged with the master gear shaft, the spring member having a protrusion extending radially outward therefrom; a pawl member pivotally mounted on the reel body and having a recess therein, the recess being engageable with the protrusion so that the pawl member engages with the ratchet when the rotating means is turned in the reverse direction and the pawl disengages from the ratchet when the rotating means is turned in the forward direction.

Advantageously, the arcuate spring member is made of a resilient plastic material and is press-fitted into an annular groove on the master gear shaft so as to provide a pre-set frictional holding force permitting rotational movement, but not axial movement, on the shaft.

The present invention will be better understood from the following detailed description when read in conjunction with the accompanying drawings, in which like parts are designated by like reference numerals or characters.

DETAILED DESCRIPTION OF THE INVENTION

A preferred embodiment of this invention will be described with reference to the accompanying drawings.

Figure 1:
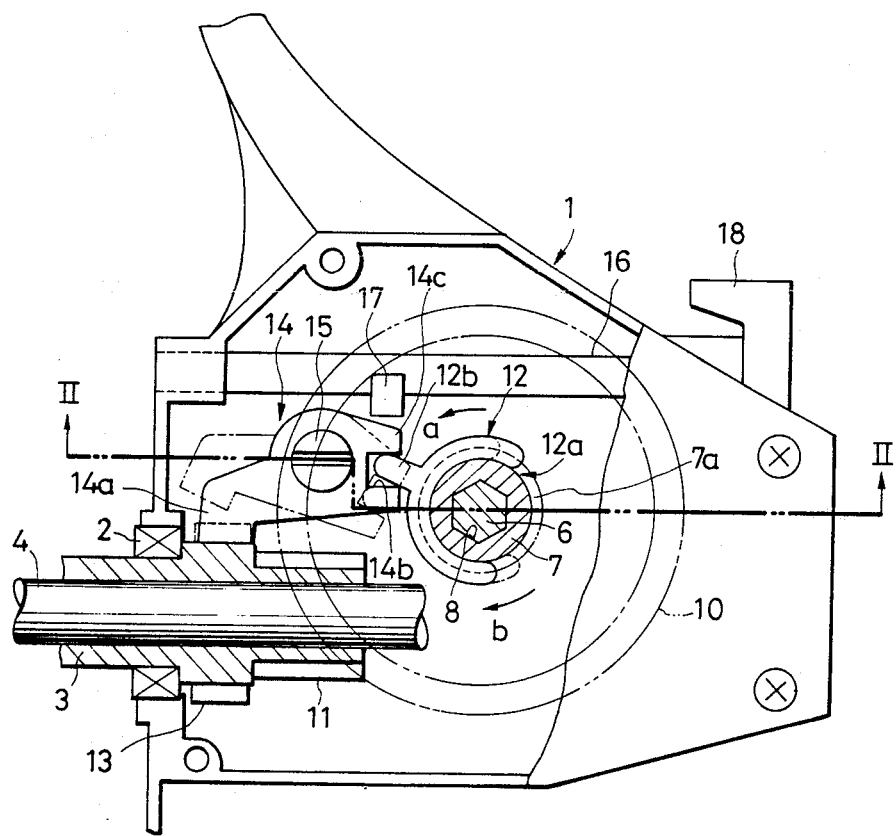
FIG. 1 is a front view, with parts cut away, showing one example of a reverse-rotation-preventing mechanism for a fishing spinning reel according to this invention.

As shown in FIG. 1, a hollow cyclindrical shaft 3 is rotatably supported by a bearing 2 fitted in the front part of a reel body 1 in such a manner that the cylindrical shaft 3 is extended forwardly. A rotor (not shown) is supported by the front end portion of the cylindrical shaft 3.

Figure 2:
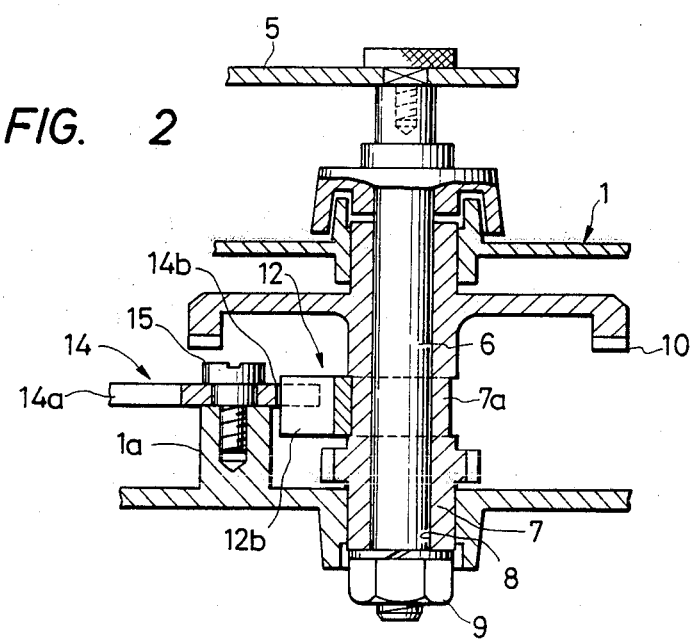
FIG. 2 is a sectional view taken along line II—II in FIG. 1.
Figure 3:
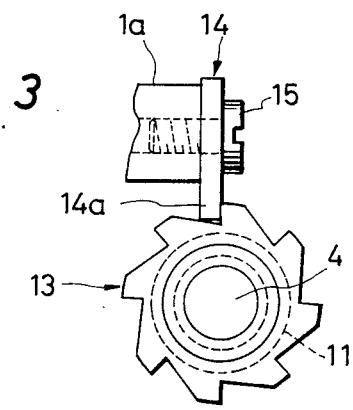
FIG. 3 is a side view showing a reverse-rotation-preventing pawl engaged with a ratchet in the mechanism according to the invention.

A main shaft 4 is slidably inserted into the cylindrical shaft 3. The main shaft 4 thus inserted is reciprocated by an oscillating mechanism (not shown) which is operatively coupled to a handle 5 (FIG. 2). Accordingly, a spool not shown) mounted on the front end portion of the main shaft 4 is also reciprocated, so that a fishing line is laid over a thread guard provided for a bail arm (not shown) of the rotor.

As shown in FIGS. 1 and 2, a handle shaft 6, to one end of which the handle 5 is connected, is rotatably inserted into the reel body 1 in such a manner that the handle shaft 6 is substantially perpendicular to the cylindrical shaft 3 and, accordingly, the main shaft 4. More specifically, the handle shaft is polygonal (hexagonal in FIG. 1) in section. The handle shaft 6 is inserted into a polygonal opening (hexagonal in FIG. 1) formed in and extending along the axis of a master gear shaft 7 which is rotatably fitted in the reel body 1. Under this condition, a nut 9 is threadably engaged with the end portion of the handle shaft 6 so that the handle shaft 6 may not come off the master gear shaft 7. Therefore, the handle shaft 6 and the master gear shaft 7 are fixed in the axial direction, and the master gear shaft 7 and a master gear 10 which is integral with the master gear shaft 7 can be rotated with the handle 5. The master gear 10 is engaged with a pinion 11 formed on the cylindrical shaft 3. Therefore, as the handle 5 is turned, the rotation of the handle 5 is transmitted through the master gear 10 and the pinion 11 to the cylindrical shaft 3 thereby to turn the rotor.

An elastic arcuate spring 12 is made of an elastic material, preferably a rubber or a plastic having a satisfactory strength and resiliency. The spring 12 is engaged with the master gear shaft 7 at a suitable level in such a manner that it is circumferentially slidable and can rotate thereon. The arcuate spring 12 is so shaped that the circumferential length thereof is slightly greater than the semi-circumference of the master gear shaft 7, i.e., to encompass slightly more than 180° of the circumference of master gear shaft 7 to avoid release of the spring from the shaft. The spring 12 has a suitable thickness and a suitable width so that its contact area with the master gear shaft 7 is sufficiently large to provide the desired frictional force on the shaft 7. The arcuate spring 12 has a mouth 12a on one side, and a protrusion 12b extending radially from the opposite side. The arcuate spring 12 is engaged with the master gear shaft 7, because the mouth 12a, which abuts the master gear shaft 7, encompasses more than 180° of the circumference. Further, the arcuate spring 12 is pushed against the master gear shaft 7 in a direction perpendicular to the axis. In this operation, the mouth 12a is opened against the elastic force of the arcuate spring 12, so that the spring 12 is mounted on the master gear shaft 7 and is held there by the elastic force of the spring 12.

An annular groove 7a whose width corresponds to that of the arcuate spring 12 is cut in the outer wall of the master gear shaft 7 as shown in FIGS. 1 and 2. The arcuate spring 12 is press-fitted into the annular groove 7a thus formed, so that the arcuate spring 12 frictionally engages the shaft 7 but is not free to move in the axial direction. A force of holding the arcuate spring 12 circumferentially on the master gear shaft 7 is pre-set to a minimum value necessary for the arcuate spring 12 to turn a reverse-rotation-preventing pawl 14 (described later).

A ratchet 13 is formed on the base portion of the pinion 11 of the cylindrical shaft 3. The reverse-rotation-preventing pawl 14 is pivotally mounted through its substantially central portion on a boss 1a with a stepped screw 15 or the like which protrudes, forwardly of the master gear shaft 7, from the inner wall of the reel body 1 in such a manner that the ratchet 13 is engageable with the end portion 14a or tongue, of the reverse rotation-preventing pawl 14.

A substantially U-shaped recess 14b is formed in the rear end portion of the reverse-rotation-preventing pawl 14 and is engaged with the protrusion 12b of the arcuate spring 12. That is, the U-shaped recess 14b of the reverse-rotation-preventing pawl 14 is engaged with the protrusion 12b of the arcuate spring 12, so that as the handle 5 is turned in the forward direction or in the reverse direction, the reverse-rotation-preventing pawl 14 is actuated, or turned clockwise or counterclockwise, (in FIG. 1) through the arcuate spring 12. More specifically, when the handle 5 is turned in the forward direction (or in the direction of the arrow a), the reverse-rotation-preventing pawl 14 is turned clockwise, thus being disengaged from the ratchet 13, so that the cylindrical shaft 3 with the rotor is rotated. When the handle 5 is turned in the reverse direction (or in the direction of the arrow b), the reverse-rotation-preventing pawl 14 is engaged with the ratchet 13, so that the reverse rotation of the cylindrical shaft 3 and, accordingly, the rotor is prevented.

According to the present invention, an anti-lever shaft 16 is supported by the reel body 1 in such a manner that it is rotatable and is held in parallel with the main shaft 4. An anti-cam 17 is mounted on the anti-lever-shaft 16 in such a manner that it is located above the rear end portion 14c of the reverse-rotation-preventing pawl 14 and in front of the master gear shaft 7. If a lever 18 secured to the rear end portion of the anti-lever-shaft 16 extended rearwardly of the reel body 1, is turned so that the anti-lever-shaft 16 is placed in an "on" state (as shown in FIG. 1, the anti-cam 17 is retracted from the rear end portion 14c of the reverse-rotation-preventing pawl 14, and therefore the pawl 14 can be pivoted by the arcuate spring 12 as was described before. When the lever 18 is turned in the opposite direction so that the anti-lever-shaft 16 is placed in an "off" state, the rear end portion 14c of the pawl 14 is pushed downwardly by the anti-cam 17. The reverse-rotation-preventing pawl 14 is then turned to the position indicated by the two-dot chain line and held there; that is, the pawl 14 is disengaged from the ratchet 13 of the cylindrical shaft 3. Accordingly, the cylindrical shaft 3 with the rotor can be turned in the forward direction or in the reverse direction with the handle 5.

As was described above, in the fishing spinning reel reverse-rotation-preventing mechanism according to this invention, the protrusion 12b radially extending from the arcuate spring 12 press-fitted on the master gear shaft 7 is engaged with the recess 14b formed in the rear end portion 14c of the reverse rotation preventing pawl 14, which is pivotally mounted in the reel body 1 in such a manner that the pawl 14 is pivoted into and out of engagement with the ratchet 13 formed on the cylindrical shaft 3 which is rotated through the master gear 10. That is, the reverse-rotation-preventing pawl 14 is engaged with or disengaged from the ratchet 13 by operating the handle clockwise or counterclockwise. Therefore, the reverse rotation preventing pawl 14 is operated directly by the protrusion 12b and the anti-cam 17. Accordingly, even if the dimensions are somewhat inaccurate, no erroneous operation is caused.

Furthermore, since the protrusion 12b of the arcuate spring 12 is engaged with the recess 14b of the reverse rotation preventing pawl 14, when the handle 5 is turned in the reverse direction with the anti-cam 17 held in the "on" state the reverse rotation preventing pawl 14 will never be disengaged from the ratchet 13; that is, the reverse rotation can be positively prevented.

In the reverse-rotation-preventing mechanism of the invention, the arcuate spring 12 is advantageously made of plastic material, and therefore, its contact area with the master gear shaft 7 is larger than that of the linear spring in the conventional reverse-rotation-preventing mechanism.

Furthermore, in the mechanism of the invention, the arcuate spring 12 does not elastically urge the reverse-rotation-preventing pawl 14. That is, in the mechanism of the present invention, unlike the conventional mechanism, the reverse rotation preventing pawl is not turned by the operating ring against the elastic force applied to the reverse rotation preventing pawl. Therefore, in the mechanism of the present invention, it is unnecessary to increase the force of the operating ring or the spring holding the master gear shaft, and the handle can be lightly turned in the forward direction. Consequently, the wear between the master gear shaft 7 and the spring 12 can be minimized, and the service life of the reverse-rotation-preventing mechanism is lengthened.

Since the protrusion 12b is integral with the spring 12, and no other spring is used, the reverse-rotation-preventing mechanism of the invention is simple in construction and low in manufacturing cost.

Having described a preferred embodiment of the present invention, it will be understood that variations and modifications thereof will become apparent to those skilled in the art, and the scope of the present invention is limited only by the appended claims.

What is claimed is:

1. A fishing spinning reel comprising:
   (a) a reel body;
   (b) a master gear shaft rotatably mounted in said reel body;
   (c) a master gear attached to said master gear shaft;
   (d) rotating means for rotating said master gear shaft and said master gear;
   (e) a cylindrical shaft rotatably mounted in said reel body and operatively connected to said master gear;
   (f) a ratchet provided integral with and rotatable together with said cylindrical shaft;
   (g) an arcuate spring member rotatably mounted on and frictionally engaged with said master gear shaft, said spring member having a protrusion extending radially outward from substantially the center of the arc of said arcuate spring member, and said spring member having a circumferential length slightly greater than the semi-circumference of said master gear shaft;
   (h) a pawl member pivotally mounted on said reel body and having a substantially U-shaped recess therein, said recess being engaged with said protrusion so that said pawl member is turned clockwise or counterclockwise when said master gear shaft is rotated and said pawl member engages with said ratchet when said rotating means is turned in a reverse direction to prevent reverse rotation of said cylindrical shaft and said pawl disengages from said ratchet when said rotating means is turned in a forward direction to permit rotation of said cylindrical shaft.

2. The reel of claim 1, wherein said master gear shaft has a polygonal opening extending along the axis thereof and said rotating means includes a handle shaft having a polygonal cross-section, said handle shaft being inserted into said polygonal opening.

3. The reel of claim 1, including a pinion on said cylindrical shaft engaging said master gear.

4. The reel of claim 1, wherein said master gear shaft is provided with an annular groove and said arcuate spring member is press-fitted in to said groove to restrict axial movement of said spring member on said master gear shaft.

5. The reel of claim 4, wherein said arcuate spring member is made of a resilient or elastic material such as plastic material and rubber.

6. A fishing spinning reel comprising:
   (a) a reel body;
   (b) a master gear shaft provided with an annular groove and rotatably mounted in said reel body;
   (c) a master gear attached to said master gear shaft;
   (d) rotating means for rotating said master gear shaft and said master gear;
   (e) a cylindrical shaft rotatably mounted in said reel body and operatively connected to said master gear;
   (f) a ratchet provided integral with and rotatable together with said cylindrical shaft;
   (g) an arcuate spring member formed of plastic or rubber and press-fitted in said annular groove and frictionally engaging said master gear shaft, said spring member having a protrusion extending radially outward from substantially the center of the arc of said arcuate spring, and said spring member having a circumferential length slightly greater than the semi-circumference of said master gear shaft;
   (h) a pawl member pivotally mounted on said reel body and having a substantially U-shaped recess therein, said recess being engaged with said protrusion so that said pawl member is turned clockwise or counterclockwise when said master gear shaft is rotated and said pawl member engages with said ratchet when said rotating means is turned in a reverse direction to prevent reverse rotation of said cylindrical shaft and said pawl disengages from said ratchet when said rotating means is turned in a forward direction to permit rotation of said cylindrical shaft; and
   (i) a lever shaft rotatably supported by said reel body, a cam mounted on said lever shaft to engage said pawl member and cause said pawl member to pivot when said lever shaft is rotated, and means for rotating said lever shaft, so that said pawl member may be disengaged from said ratchet to permit said rotating means to be turned in either of said directions.

* * * * *